(12) United States Patent
Fukuda et al.

(10) Patent No.: US 12,339,292 B2
(45) Date of Patent: Jun. 24, 2025

(54) AUTOMATIC ANALYZER

(71) Applicant: Hitachi High-Tech Corporation, Tokyo (JP)

(72) Inventors: Nobuya Fukuda, Tokyo (JP); Kazuhiro Noda, Tokyo (JP); Yukinori Sakashita, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 796 days.

(21) Appl. No.: 17/596,247

(22) PCT Filed: Feb. 25, 2020

(86) PCT No.: PCT/JP2020/007336
§ 371 (c)(1),
(2) Date: Dec. 6, 2021

(87) PCT Pub. No.: WO2020/255488
PCT Pub. Date: Dec. 24, 2020

(65) Prior Publication Data
US 2022/0317140 A1 Oct. 6, 2022

(30) Foreign Application Priority Data
Jun. 17, 2019 (JP) ................................. 2019-111810

(51) Int. Cl.
*G01N 35/10* (2006.01)
*B01L 3/00* (2006.01)
*G01N 35/00* (2006.01)

(52) U.S. Cl.
CPC .............. *G01N 35/10* (2013.01); *B01L 3/502* (2013.01); *B01L 2200/026* (2013.01);
(Continued)

(58) Field of Classification Search
CPC ......... G01N 35/10; G01N 2035/00435; G01N 2035/00455; G01N 35/1002;
(Continued)

(56) References Cited

U.S. PATENT DOCUMENTS

2010/0248346 A1  9/2010 Kaneko et al.

FOREIGN PATENT DOCUMENTS

JP       57-14796 A     1/1982
JP     2009-92297 A     4/2009
(Continued)

OTHER PUBLICATIONS

International Search Report (PCT/ISA/210) issued in PCT Application No. PCT/JP2020/007336 dated Apr. 21, 2020 with English translation (five (5) pages).
(Continued)

*Primary Examiner* — Jill A Warden
*Assistant Examiner* — Jacqueline Brazin
(74) *Attorney, Agent, or Firm* — Crowell & Moring LLP

(57) ABSTRACT

Provided is a reagent cooler that prevents occurrence of condensation and further uniforms a temperature in the cooler with low power consumption and a simple structure. The reagent cooler includes a refrigerant pipe that is disposed inside an outer wall of the reagent cooler 103 and circulates a refrigerant inside the outer wall; a blowing pipe 109 that is disposed inside the outer wall and guides outside air existing outside the reagent cooler to inside of the reagent cooler; and a blowing unit 114 that is disposed at the blowing pipe and diffuses the outside air into the inside of the reagent cooler through the blowing pipe. With the outside air cooled by the outer wall and taken into the inside of the reagent cooler, the reagent cooler is positively pressurized and the internal temperature is made uniform.

10 Claims, 3 Drawing Sheets

(52) U.S. Cl.
CPC ..... *B01L 2200/16* (2013.01); *B01L 2300/048* (2013.01); *B01L 2300/0681* (2013.01); *B01L 2300/14* (2013.01); *B01L 2300/1894* (2013.01); *G01N 2035/00435* (2013.01); *G01N 2035/00455* (2013.01)

(58) Field of Classification Search
CPC .. G01N 2035/00445; G01N 2035/0443; B01L 3/502; B01L 2200/026; B01L 2200/16; B01L 2300/048; B01L 2300/0681; B01L 2300/14; B01L 2300/1894
USPC .......................................................... 422/65
See application file for complete search history.

(56) References Cited

FOREIGN PATENT DOCUMENTS

| | | | |
|---|---|---|---|
| JP | 2009-270857 A | | 11/2009 |
| JP | 2010-237021 A | | 10/2010 |
| JP | 2010237021 | * | 10/2010 |
| JP | 2013-185980 A | | 9/2013 |
| JP | 2013185980 | * | 9/2013 |
| JP | 6496230 B2 | | 4/2019 |
| JP | 2017074011 | * | 4/2019 |
| WO | WO-2006007884 A1 | * | 1/2006 ................ B01L 1/00 |

OTHER PUBLICATIONS

Japanese-language Written Opinion (PCT/ISA/237) issued in PCT Application No. PCT/JP2020/007336 dated Apr. 21, 2020 (four (4) pages).

Japanese-language International Preliminary Report on Patentability (PCT/IPEA/409) issued in PCT Application No. PCT/JP2020/007336 dated Mar. 31, 2021 (four (4) pages).

* cited by examiner

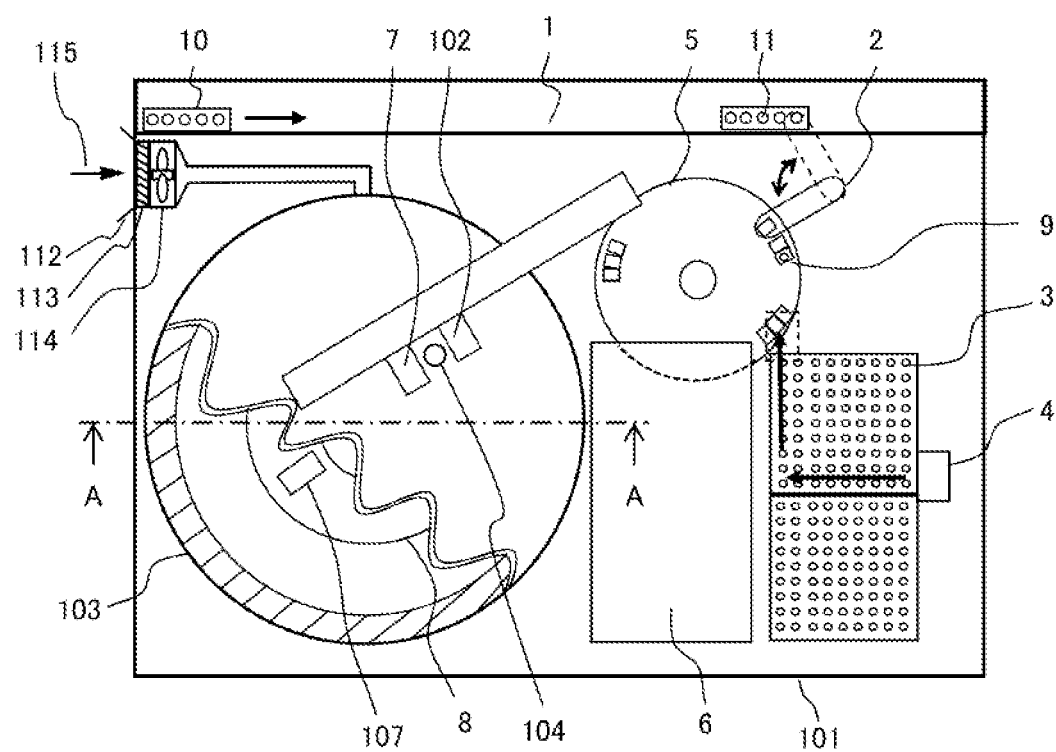
[FIG. 1]

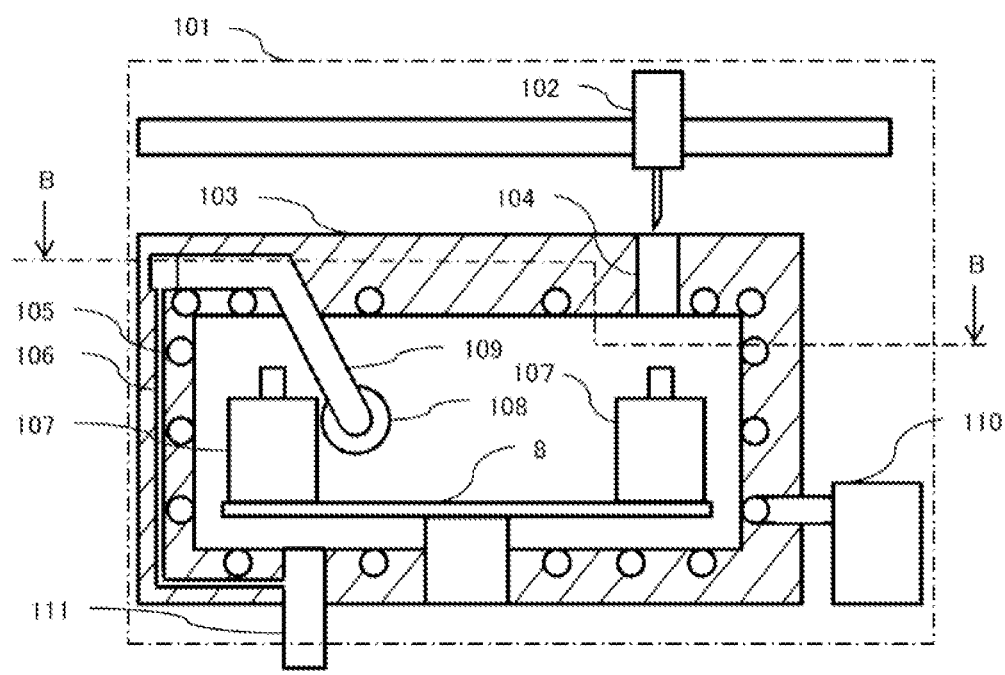
[FIG. 2]

[FIG. 3]
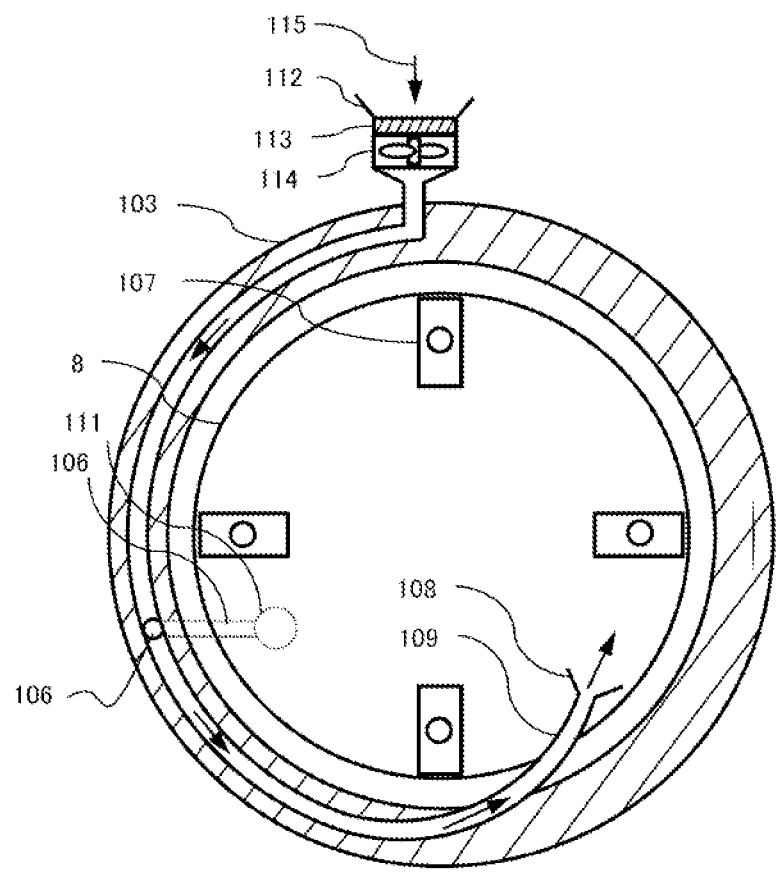

AUTOMATIC ANALYZER

TECHNICAL FIELD

The present invention relates to an automatic analyzer.

BACKGROUND ART

Conventionally, an automatic analyzer that performs analysis by mixing various reagents and a sample is provided with a reagent cooler that holds the various reagents. The reagent cooler has a reagent aspiration hole in a portion of the lid member so that the held reagent can be easily aspirated, and the reagent aspiration hole is always open.

Generally, the inside of the reagent cooler is kept at a lower temperature than the room temperature. However, since the reagent aspiration hole is always open, outside air flows in through the hole, causing dew condensation inside the reagent cooler. In addition, the inflow of outside air causes a rise in the temperature in the vicinity of the reagent aspiration hole and makes the temperature distribution inside the cooler ununiform. Therefore, Patent Literature 1 discloses a technique that prevents inflow of outside air and dew condensation by feeding cooled air from outside the reagent cooler.

CITATION LIST

Patent Literature

Patent Literature 1: Japanese Patent Application Laid-Open No. 2009-270857.

SUMMARY OF INVENTION

Technical Problem

In the prior art, cooling of the reagent cooler, cooling of the air to be fed into the reagent cooler, and air stirring means to uniformize the temperature inside the reagent cooler have been performed using different devices. Using different devices in this way poses a problem about a rise in the power consumption of the automatic analyzer and a problem that the structure becomes complicated.

The object of the present invention is to provide an automatic analyzer that solves the above problems and can prevent dew condensation in the reagent cooler and permit temperature uniformization with low power consumption and a simple structure.

Solution to Problem

In order to achieve the above object, the present invention provides an automatic analyzer that performs analysis by mixing a reagent and a sample and includes: a reagent cooler that stores a reagent vessel; a refrigerant pipe that is disposed inside the outer wall of the reagent cooler and circulates a refrigerant inside the outer wall; a blowing pipe that is disposed inside the outer wall and guides outside air existing outside the reagent cooler to the inside of the reagent cooler; and a blowing unit that is disposed at the blowing pipe and diffuses the outside air into the inside of the reagent cooler through the blowing pipe.

Advantageous Effects of Invention

According to the present invention, it is possible to provide a reagent cooler with low power consumption and a simple structure, in which outside air is taken into the reagent cooler and cooled with the cooled air of the refrigerant cooler itself during that process and by blowing air into the reagent cooler, the inside of the reagent cooler is positively pressurized to prevent inflow of outside air through an aspiration hole and thereby prevent dew condensation and the temperature in the cooler can be made uniform by blowing the outside air.

BRIEF DESCRIPTION OF DRAWINGS

FIG. 1 is a plan view showing an outline of an automatic analyzer.

FIG. 2 is a schematic sectional view taken along line A-A of the automatic analyzer.

FIG. 3 is a sectional view taken along line B-B of a configuration outline.

DESCRIPTION OF EMBODIMENTS

Hereinafter, an embodiment of the present invention will be described in detail referring to drawings. In all the drawings that explain the embodiment, basically the same elements are designated by the same reference signs and repeated description thereof is omitted.

First Embodiment

The first embodiment is an embodiment as an automatic analyzer that performs analysis by mixing a reagent and a sample and includes: a reagent cooler that stores a reagent vessel; a refrigerant pipe that is disposed inside an outer wall of the reagent cooler and circulates a refrigerant inside the outer wall; a blowing pipe that is disposed inside the outer wall and guides outside air existing outside the reagent cooler to the inside of the reagent cooler; and a blowing unit that is disposed at the blowing pipe and diffuses the outside air into the inside of the reagent cooler through the blowing pipe.

FIG. 1 is a plan view that shows an outline of an automatic analyzer 101. The automatic analyzer 101 mixes a sample and a reagent and automatically analyzes the mixed sample to be measured. As shown in FIG. 1, the automatic analyzer 101 includes a transport line 1, a sample probe 2 for aspirating a sample, a reaction vessel supplier 3, a reaction vessel supply mechanism 4, a reaction vessel table 5 (incubator), a reaction measurement device 6, a reagent stirring rod 7, a reagent disk 8, a reagent probe 102, a reagent cooler 103, and further an intake port 112, a filter 113, and a blowing unit 114.

The reaction vessel supplier 3 holds a plurality of reaction vessels 9. The reaction vessel supply mechanism 4 supplies a reaction vessel 9 held by the reaction vessel supplier 3 to the reaction vessel table 5. The reaction vessel table 5 moves the supplied reaction vessel 9 to the sample discharge position where a sample is discharged from the sample probe 2, by its own rotation.

The reagent cooler 103 stores a reagent vessel 107 that contains a reagent. The reagent cooler 103 has a cylindrical shape in which the side wall has an outer wall and an inner wall and its top forms a lid. FIG. 1 shows the inside of the reagent cooler 103 in which the lid is partially deleted. As illustrated in the figure, an aspiration hole 104 is made in the lid at the top of the reagent cooler 103. As shown here, the reagent cooler 103 has an inner wall inside the outer wall.

The top of the reagent vessel 107 is open. The reagent stirring rod 7 is moved to the reagent stirring position where the reagent contained in a reagent vessel 107 is stirred. The reagent stirring rod 7 is inserted into the reagent vessel 107 through the aspiration hole 104 and the top of the reagent vessel 107. Then, the reagent stirring rod 7 stirs the reagent contained in the reagent vessel by being rotated while inserted. The reagent stirring rod 7 that has stirred the reagent is pulled out of the reagent vessel 107.

After that, the reagent probe 102 is moved to the reagent aspiration position where the reagent is aspirated from the reagent vessel 107. Then, the reagent probe 102 is inserted into the reagent vessel 107 through the aspiration hole 104 and the top of the reagent vessel 107. Then, the reagent probe 102 aspirates the reagent from the reagent vessel 107 while inserted.

The reagent probe 102 that has aspirated the reagent is pulled out of the reagent vessel 107. After that, the reagent probe 102 is moved to the reagent discharge position and it discharges the reagent into a reaction vessel 9. After the reagent is discharged, the reaction vessel table 5 moves the reaction vessel 9 to the sample discharge position where the sample is discharged from the sample probe 2, by its own rotation.

The transport line 1 transports the sample vessel 11 held by a test tube rack 10 to the sample aspiration position where the sample is aspirated from the sample probe 2. The sample vessel 11 contains a sample. The top of the sample vessel is open. After the sample vessel 11 is transported to the sample aspiration position, the sample probe 2 is inserted from the top of the sample vessel 11. Then, the sample probe 2 aspirates the sample from the sample vessel 11 while inserted.

After aspiration of the sample, the sample probe 2 is pulled out of the sample vessel 11. After that, the sample probe 2 is moved to the sample discharge position. After the sample probe 2 is moved to the sample discharge position, it discharges the aspirated sample into the reaction vessel 9.

A stirring mechanism (not shown) stirs the reagent and sample that have been discharged into the reaction vessel 9. The reagent and sample that have been stirred are left as they are, for a prescribed time. After that, the reaction vessel 9 is moved to a reaction measurement device 6. Then, the reaction measurement device 6 measures the state of reaction between the reagent and sample contained in the reaction vessel 9 that has been moved.

At least one reagent vessel 107, for example, four reagent vessels are disposed on the reagent disk 8 and as the reagent disk 8 rotates, the reagent to be stirred and aspirated by the reagent stirring rod 7 and reagent probe 102 can be replaced.

FIG. 2 is a sectional view taken along line A-A of the automatic analyzer. As shown in the figure, between the inner wall and outer wall of the side wall, lid and bottom of the reagent cooler 103, refrigerant pipes 105 are provided in contact with the inner wall of the reagent cooler 103. The refrigerant pipe 105 is made of a material with high thermal conductivity. The refrigerant pipe 105 is connected to a cooling device 110 and the refrigerant cooled by the cooling device 110 is circulated in the refrigerant pipe 105. The refrigerant pipe 105 is cooled by circulation of the refrigerant and the inner wall of the reagent cooler 103 that is in contact with the refrigerant pipe 105 is cooled. The cool air from the inner wall is transmitted to the inside of the reagent cooler 103 so that the inside of the reagent cooler 103 is cooled to a given temperature.

As an example, the cooling temperature here is assumed to be approximately 6.5° C. Furthermore, a material with low thermal conductivity is filled between the outer wall and inner wall of the reagent cooler 103 (shaded portion in FIG. 2) so as to prevent the influence of the outside air temperature.

As shown in FIG. 2, a large drain pipe 111 is provided at the bottom of the reagent cooler 103 and if dew condensation occurs inside the reagent cooler 103, dew drops are discharged through the large drain pipe 111 outside the reagent cooler 103 downward in the figure.

FIG. 3 is a sectional view taken along line B-B of the configuration outline in FIG. 2. A blowing pipe 109 is a pipe to take the air outside the reagent cooler 103 into the reagent cooler 103 through an intake port 112. The blowing pipe 109 extends between the inner wall and outer wall of the reagent cooler 103 (shaded portions in FIG. 3) and contacts the refrigerant pipes 105 as shown in FIG. 2. The blowing pipe 109 is made of a material with high thermal conductivity and cooled by contact with the refrigerant pipes 105. As it is cooled in this way, the gas passing inside the blowing pipe 109 is also cooled.

The intake port 112 and blowing port 108 are respectively attached to the start end and terminal end of the blowing pipe 109. The intake port 112 is disposed outside the outer wall of the reagent cooler 103 and the blowing port 108 is disposed more inward than the inner wall of the reagent cooler 103 and along the inner wall. The blowing pipe 109 includes a blowing unit 114 and a filter 113 that prevents penetration of foreign matters on the intake side of the blowing unit 114. One example of the blowing unit 114 may be a fan. The blowing unit 114 is located between the intake port 112 and the blowing port 108. As a concrete example of the first embodiment, FIG. 3 shows that the unit is adjacent to the intake port 112, but instead it may be adjacent to the blowing port 108. 115 indicates the flow of air into the intake port 112.

The length of the blowing pipe 109 is such a length that the temperature of the outside air taken through the intake port 112 at the time when the outside air flows from the blowing port 108 is within 5° C. from the temperature in the reagent cooler 103. For example, if the temperature in the reagent cooler 103 is 6.5° C., the length should be such that the temperature of the outside air is in the range of 11.5° C. to 1.5° C. Specifically, the length of the portion of the blowing pipe 109 existing inside the outer wall of the side wall is set such that the difference between the temperature of the outside air at the time when the outside air is taken into the blowing unit 114 and the temperature in the reagent cooler 103 is 5 degrees or lower. FIG. 3 illustrates a case that the blowing pipe is disposed along about a half of the whole circumference (360 degrees) of the side wall, but it is acceptable that the blowing pipe is disposed at least 45 degrees along the side wall. In other words, it is preferable that the portion of the blowing pipe 109 that exists inside the outer wall of the reagent cooler 103 should be disposed 45° or larger along the side wall of the cylindrical reagent cooler 103.

As shown in FIG. 2 and FIG. 3, a small drain pipe 106 is provided in the blowing pipe 109 between the intake port 112 and the blowing port 108. Preferably the small drain pipe 106 is closer to the blowing port 108 than the half point of the blowing pipe 109. Specifically, the start end and terminal end of the blowing pipe are respectively attached to the intake port and blowing port and the small drain pipe with a small diameter is provided closer to the blowing port than the half point of the blowing pipe.

The terminal end of the small drain pipe 106 is connected to the large drain pipe 111. Consequently, the dew condensation water that is generated in the blowing pipe 109 when the outside air taken in from the intake port 112 by the blowing pipe 109 is cooled in the blowing pipe 109 passes from the small drain pipe 106 through the large drain pipe 111 and is discharged outside the reagent cooler 103 as shown in FIG. 2. In other words, the blowing pipe 109 is connected to a pipe whose terminal end is outside the reagent cooler 103. This pipe is comprised of a small drain pipe as a small diameter pipe connected to the blowing pipe 109, and a large drain pipe that is provided at the bottom of the reagent cooler and connected to the small diameter pipe and has a larger diameter than the small diameter. The large drain pipe as the large diameter pipe has its terminal end outside the reagent cooler.

As described above, cooled outside air is introduced through the blowing pipe 109 into the reagent cooler 103 of the automatic analyzer according to this embodiment. Consequently, the reagent cooler 103 is positively pressurized to prevent inflow of outside air from the aspiration hole 104 in the lid and thereby prevent dew condensation. Furthermore, as the cooled outside air is blown from the blowing port 108 into the reagent cooler 103, the air inside the reagent cooler 103 is stirred and the internal temperature is made uniform. Preferably, in order to improve the air stirring efficiency, the blowing port 108 of the blowing pipe 109 is disposed more inward than the inner wall of the reagent cooler 103 and along the inner wall.

The present invention is not limited to the abovementioned embodiment but includes various variations. For example, the abovementioned embodiment has been described in detail for better understanding of the present invention and the invention is not limited to an embodiment that includes all the elements described above.

REFERENCE SIGN LIST

1 transport line
2 sample probe
3 reaction vessel supplier
4 reaction vessel supply mechanism
5 reaction vessel table
6 reaction measurement device
7 reagent stirring rod
8 reagent disk
9 reaction vessel
10 test tube rack
11 sample vessel
101 automatic analyzer
102 reagent probe
103 reagent cooler
104 aspiration hole
105 refrigerant pipe
106 small drain pipe
107 reagent vessel
108 blowing port
109 blowing pipe
110 cooling device
111 large drain pipe
112 intake port
113 filter
114 blowing unit
115 air flow

The invention claimed is:

1. An automatic analyzer that performs analysis by mixing a reagent and a sample, the automatic analyzer comprising:

a reagent cooler that stores a reagent vessel, the reagent cooler having an outer wall, an inner wall inside the outer wall and a lid with an aspiration hole;

a refrigerant pipe that is disposed inside an outer wall of the reagent cooler and that circulates a refrigerant inside the outer wall;

a blowing pipe that is disposed inside the outer wall and that guides outside air existing outside the reagent cooler to inside of the reagent cooler, the blowing pipe having an intake port and a blowing port respectively attached to a start end thereof and to a terminal end thereof; and a blowing unit that is disposed at the blowing pipe between the intake port and the blowing port and that diffuses the outside air into the inside of the reagent cooler through the blowing pipe and the blowing port, wherein a pipe having a terminal end outside the reagent cooler is connected to the blowing pipe, the pipe includes a small diameter pipe connected to the blowing pipe between the intake port and the blowing port and a large diameter pipe having a diameter larger than that of the small diameter pipe, provided at a bottom of the reagent cooler and connected to the small diameter pipe, and the large diameter pipe has the terminal end outside the reagent cooler.

2. The automatic analyzer according to claim 1, wherein a length of a portion existing inside the outer wall of the blowing pipe is set such that a difference between a temperature of the outside air when the outside air is taken into the blowing unit and a temperature in the reagent cooler is 5 degrees or lower.

3. The automatic analyzer according to claim 1, wherein a side wall of the reagent cooler is cylindrical, and a portion existing inside the outer wall of the blowing pipe is disposed at 45° or more of the cylindrical side wall.

4. The automatic analyzer according to claim 1, wherein the small diameter pipe is provided closer to the blowing port than half of the blowing pipe.

5. The automatic analyzer according to claim 1, wherein a filter that prevents foreign matters is provided on an intake side of the blowing unit.

6. The automatic analyzer according to claim 1, wherein the blowing unit positively pressurizes the reagent cooler in order to prevent inflow of the outside air from the aspiration hole.

7. The automatic analyzer according to claim 1, wherein the reagent cooler includes an inner wall inside the outer wall.

8. The automatic analyzer according to claim 7, wherein an intake port and a blowing port are respectively attached to a start end and a terminal end of the blowing pipe, and the blowing port is disposed along the inner wall inward than the inner wall of the reagent cooler.

9. The automatic analyzer according to claim 7, wherein the refrigerant pipe and the blowing pipe are disposed between the outer wall and the inner wall.

10. The automatic analyzer according to claim 9, wherein the refrigerant pipe is in contact with the inner wall.

* * * * *